Oct. 20, 1936.                I. COWLES                2,058,062
                             SWIVEL JOINT
                          Filed May 9, 1936
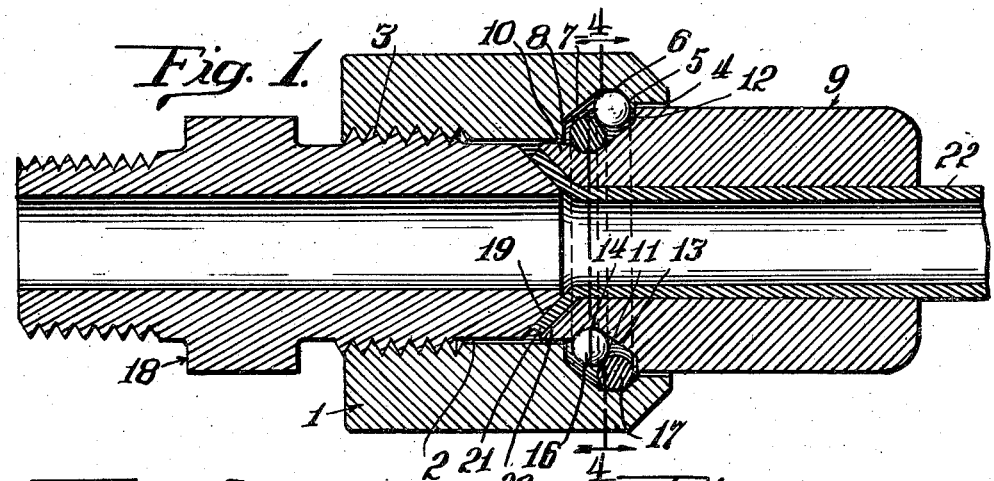
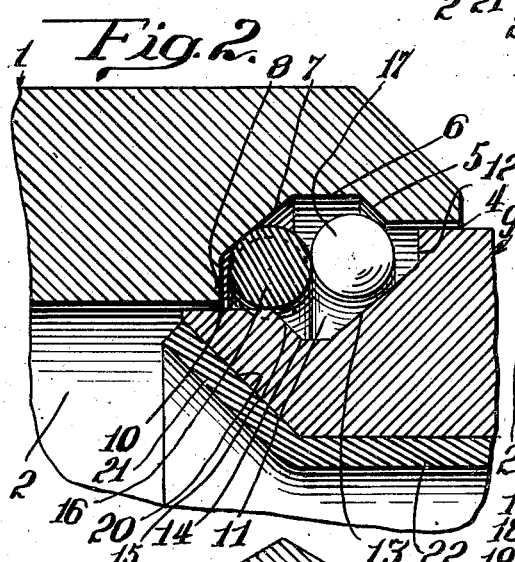
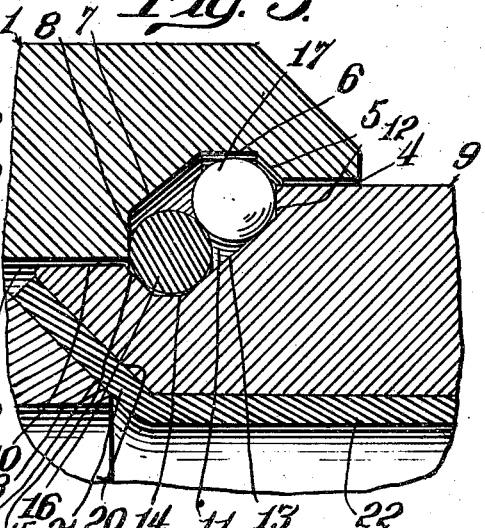
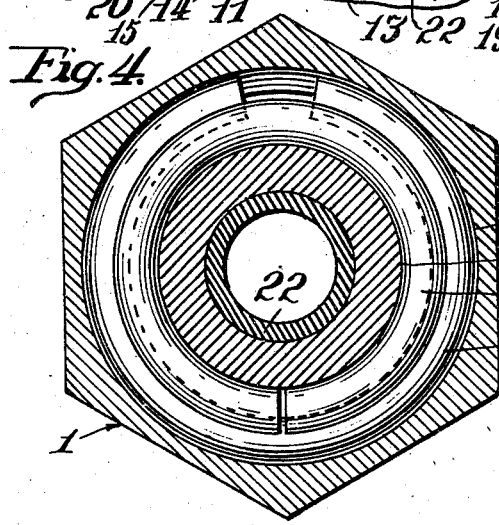
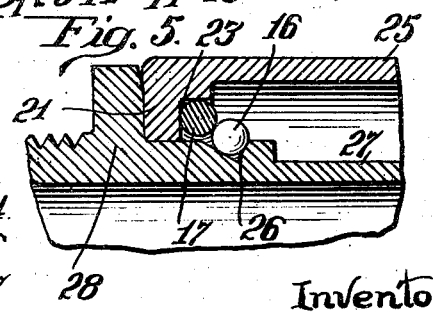
Inventor
Irving Cowles Patented Oct. 20, 1936

2,058,062

UNITED STATES PATENT OFFICE 2,058,062

SWIVEL JOINT

Irving Cowles, Detroit, Mich.

Application May 9, 1936, Serial No. 78,778

9 Claims. (Cl. 285—9)

The invention relates particularly to swivel joints of the type that are used for coupling pipes, tubing, rubber hose and possibly other purposes and has for its main object to provide a structure of this nature which is easily manufactured and assembled and which, when assembled, presents certain advantages which are pointed out in detail in the specification as follows:

In the accompanying drawing, illustrating suitable embodiments of the invention, Fig. 1 is a central, longitudinal, sectional view of a swivel joint constructed in accordance with the present invention as applied to a device for coupling metal tubing with a companion element such as an outlet from a source of supply of fluid to be transmitted to a point of consumption by the tubing.

Figs. 2 and 3 are relatively fragmentary, detail sectional views similar to Fig. 1, showing the relative positions of the component elements of the swivel joints during and following assembly thereof, respectively.

Fig. 4 is a cross sectional view taken on the line 4—4 of Fig. 1.

Fig. 5 is a fragmentary central longitudinal sectional view of a hose coupling equipped with a swivel joint embodying the invention.

Referring first to Fig. 1, it will be seen that the swivel joint comprises a female member (1), having a central bore (2) which is partly threaded internally as at (3) at one end portion thereof. The other end portion of said member (1) is equipped with a mouth (4) of larger diameter than the bore (2). Inwardly of said mouth (4), the said member (1) is equipped with an annular groove which is provided with an outer beveled wall (5) bordering a substantially cylindrical wall (6) disposed inwardly of said beveled wall (5) and which is bordered at its inner end by a beveled wall (7) extending practically perpendicularly to the wall (5) and is disposed at an angle of approximately 38 to 40 degrees to the longitudinal axis of the member (1). Bordering the inner end of the wall (7) is an annular shoulder (8) which is substantially perpendicular to the bore (2) of the said member (1) and to the longitudinal axis of the latter. Said annular groove will be referred to hereinafter as the groove (5).

The companion member of the swivel joint consists of a male member (9) which is of slightly smaller diameter than the mouth portion (4) of what may be termed the "socket" end of the female member (1). Said male member (9) projects, in part, loosely telescopically into the mouth (4) of the member (1) and is equipped at its inner end with a smaller diameter cylindrical portion (10) which fits loosely telescopically within the bore (2) of the member (1). Between said cylindrical portion (10) and the body portion of the member (9), the latter is provided with an annular groove (11) constituting a companion to the groove (5) and which, in the completed structure, is opposed to the latter. The groove (11) presents an annular shoulder (12) extending perpendicularly to the axis of the member (9) and is opposed to the beveled wall (5) of the groove in the female member. The groove (11) also includes a beveled wall (13) extending parallel, or substantially parallel, with the beveled wall (7) of the groove (5) and is opposed to the latter. Said beveled wall (13) meets at one end, the cylindrical wall portion (14) which, in turn terminates at shoulder (15) which is beveled and is substantially parallel with and opposed to the beveled wall (5) of the groove of the female member.

Disposed within the annular chamber defined by said grooves (5) and (11), respectively is a pair of split rings (16) and (17), respectively, of suitable wire, said rings, in the finished structure, being of respectively different diameters, the one lying farthest within the socket formation of the female member being of appreciably smaller outer diameter than the split ring (17). The relative diameters of said rings (16) and (17) are such that said rings are disposed in overlapping position, the ring (16) being of larger outer diameter than the inner diameter of the ring (17).

Initially and normally the rings (16) and (17) are of slightly smaller inner diameter than the lower end of the bore (2) and of approximately the same diameter as the mouth of the member (1).

In Fig. 2, the rings (16) and (17) are shown to be in a position in which they are of substantially equal diameter and both thereof are of smaller diameter than the mouth (4) of the female member (1), the ring (17) being now in the position at which it will expand. Both of said rings are also shown to be normally of the same, or substantially the same, inner diameter as the inner end portion (10) of the male member (9). Accordingly, in assembling the device, the ring (17) may be sprung into the groove (5) of the female member (1) and the ring (16) may be carried in the groove of the male member (9). The initial relative positions of the component elements 1, 9, 16 and 17 of the structure may be said to be that shown in Fig. 2 and from this position, the male member (9) is moved to final position in the socket of the female member as shown in Fig. 3. The ring (17) abuts the ring (16) at all times.

If now the member (9) is subjected to pull outwardly from the female member (1), the ring (16) will act to expand the ring (17) and force the latter against the cylindrical wall (6) of the groove (5) and thus a very powerful wedging action is exerted by the ring (16) upon the ring (17) to expand the latter and vice versa. This causes the ring (16) to be contracted to the position shown in Fig. 3. When in this position, the center of the ring (16), in cross-section, will be disposed slightly inwardly of the cylindrical surface of the body of the member (9). The greater the pull on the member (9), the greater will be the resistance offered by the rings (16) and (17) to separation of the members (9) and (1) and then the relative position of said rings is such as to cause them to present the maximum resistance to shearing.

It will be obvious, also that the action of the rings (16) and (17), in cooperation with the surfaces with which they are in contact during the attempts to separate or detach the member (9) from the member (1), will tend to maintain the member (9) centered relatively to the member (1) or maintained in axial alignment with the same.

In the instance illustrated, the member (1) receives the threaded end portion of a coupling member (18) equipped with a beveled inner extremity (19) which is opposed to a similarly beveled end (2) of the male member (9). This type of coupling is known in the automotive industry as an S. A. E. tubing coupling, the flared end portion (21) constituting a beveled annular flange of a length of tubing (22) which passes through the central bore of the male member (9) being engaged between said beveled surfaces (19) and (2) to produce a fluid-tight joint between the member (18) and the member (19). The application of pressure upon said flange (21) tends to eject the male member (9) from the female member (1) and this is prevented by the said split rings (16) and (17) in the manner hereinbefore described.

In the ordinary practice of disposing a single split ring in opposed grooves of two telescopically interfitting members, the relative diameters of said members are required to be such as will provide sufficient annular space between them to permit the ring to be sprung into place. This requires room in the grooves for expansion and contraction of the ring from its normal diameter and only those portions of the ring lying beyond the annular space between the members coupled thereby, and projecting inwardly and outwardly of said space, are effective to prevent separation of said members and, therefore, the thickest portion of said ring, if composed of round wire, lies within said annular space and can offer only a limited resistance to separation of said members.

In the structure of the present invention, the thickest portions of both rings carry the separating stress and, therefore, and because of their wedge action upon each other, make it impossible to separate the male and female members.

The advantage of the structure shown and described herein will be appreciated when viewed in the light of the separating stress or strain to which the male and female members are subjected when wrenches are applied to both thereof in order to clamp the flange (21) of the tube (22) to provide fluid-tight joint capable of resisting extremely high pressures of twenty thousand pounds per square inch and more.

In Fig. 5, I have illustrated another embodiment of the invention as applied, for example, to a hose coupling wherein the ring (17) is confined in an annular groove (23) bordering the central opening in the end wall (24) of the shell cylindrical member (25) of the coupling and the ring (16) is engaged in an annular recess (26) in the stem (27) of the male member (28) of said coupling. Said rings (16) and (17) of Fig. 5 are closely confined and prevent the slight relative longitudinal movement of the members (25) and (28) permitted by the structure illustrated in Figs. 1 to 4 inclusive, the cooperation of said rings with each other and the walls with which they are engaged being the same as hereinabove described with reference to Figs. 1 to 4.

I claim as my invention:

1. A swivel joint for coupling two relatively rotatable elements, comprising a female socket formation in one of said elements equipped with an annular groove having a bottom wall presenting a lower end portion extending angularly to the axis of the socket and flaring toward the mouth thereof, and an upper portion disposed substantially concentric with the axis of said socket, a top wall extending substantially transversely to said lower wall portion and angularly to the said upper wall portion and converging toward the mouth of said socket, the said lower wall portion bordered by a wall extending substantially perpendicularly to the axis of the said socket and bordering a central opening in said member of smaller diameter than the mouth of the socket, a male member presenting cylindrical spaced apart portions, one of which substantially fits within the said central opening of the female member and the other of which substantially fits within the mouth of said socket, there being an annular groove in said male member between said portions of different diameters of the latter and of cross-sectional shape similar to the annular groove of said socket formation and having its several wall portions reversed in relative positions with respect to the several wall portions of the first-named annular groove, and a pair of split rings of different diameters trapped in said respective annular grooves and disposed in overlapping and interengaging relation to each other.

2. A swivel joint comprising axially aligned male and female members, the female members equipped with a socket formation presenting a partially undercut annular groove disposed angularly to the axis of said member, the male member equipped with companion annular groove opposed to that of the female member and extending substantially similarly angularly to the axis of the male member, and a pair of split rings of respectively different diameters trapped in both said grooves in overlapping relation to each other and cooperating with the top wall of the first-named and the bottom wall of the second named groove to cause the larger diameter ring to be expanded and the smaller diameter ring to be contracted responsively to longitudinal stresses upon said members to limit their relative longitudinal movements.

3. A swivel joint comprising axially aligned male and female members, the female member equipped with a socket formation presenting an annular internal groove in its circumferential wall, the latter having an upper cylindrical wall portion, inwardly extending beveled walls bordering and extending inwardly therefrom, and a bottom wall disposed substantially perpendicularly to the axis of said member, the male member equipped with an annular groove presenting a lower cylindrical wall portion bordered by outwardly flaring beveled wall portions and a top wall substantially parallel with the bottom wall of the groove of the female member, a pair of split rings trapped in said grooves and occupying space longitudinally of the members slightly less than the length of said respective grooves, the walls of said grooves cooperating with the different diameters of said rings to expand the larger and contract the smaller thereof in response to longitudinal stresses applied to said members tending to separate the same, thereby maintaining said members in interlocked relation.

4. A self-locking swivel joint comprising axially aligned male and female members, the female member equipped with a socket formation presenting an annular internal groove in its circumferential wall, the latter having an upper cylindrical wall portion, inwardly extending beveled walls bordering and extending inwardly therefrom, and a bottom wall disposed substantially perpendicularly to the axis of said member, the male member equipped with an annular groove presenting a lower cylindrical wall portion bordered by outwardly flaring beveled wall portions and a top wall substantially parallel with the bottom wall of the groove of the female member, a pair of split rings trapped in said grooves, both of said rings being contractible to a diameter enabling the same to pass into said socket formation and both expansible to a diameter enabling the bottom wall of the groove of the male member to pass through the same in effecting assembly of the structure, the several walls of said respective grooves acting upon said rings to cause the innermost thereof to be maintained permanently of smaller diameter than the other ring and acting also to cause the latter to be expanded to hug the cylindrical and upper beveled walls respectively of the groove of the female member and cause the companion ring to hug the cylindrical and lower beveled wall of the groove of the male member upon applying separating force to said members.

5. A self-locking swivel joint comprising male and female members having telescopically interengaged end portions, the latter being provided with opposed annular grooves extending angularly to the axes of said members and cooperating to form an annular chamber, and a pair of resilient split rings of respectively different diameters disposed within and substantially filling said chamber, the smaller of said rings being of larger outer diameter than the inner and less than the outer diameter of the other ring and the latter being normally of larger outer diameter than the open end of the female member receiving the said end portion of the male member, the smaller ring being of larger outer diameter than the inner extremity of said end portion of said male member.

6. A self-locking swivel joint comprising a member equipped in one end portion with a socket, a companion member equipped with an end portion substantially fitting within said socket, said respective end portions of said members equipped with opposed annular grooves, the groove of the first-named member lying in the outer wall of said socket, both said grooves being of larger diameter adjacent the mouth of said socket than at their inner end portions, and a pair of resilient split rings of respectively different diameters each engaged in part in both said grooves and trapped therein, said rings being permanently disposed in overlapping relation to each other and acting upon each other to expand the larger and contract the smaller thereof responsively to stresses tending to separate said members.

7. A self-locking swivel joint comprising a member equipped in one end portion with a socket, a companion member equipped with an end portion substantially fitting within said socket, there being an annular groove in the inner wall of said socket and a companion annular groove in the portion of the second member lying within said socket, said grooves defining an annular chamber adapted to receive key members, said chamber presenting opposed substantially cylindrical walls between its ends bordered by beveled walls, the beveled walls of one groove converging toward the beveled walls of the other thereof, and a pair of resilient split rings of respectively different diameters constituting key members trapped in said chamber and retained in concentric overlapping relation to each other therein, the walls of said grooves acting to limit the contraction of the smaller and expansion of the larger ring when applying separating stress to said members to maintain said rings in overlapping relation to each other and cause the smaller ring to exert expanding force on the larger thereof during application of said stress.

8. A swivel joint for a pair of pivotally interengaged coaxial male and female members equipped with cooperating means limiting their relative axial movement in one direction, said members equipped with annular grooves each presenting an annular shoulder opposed to the annular shoulder of the other member, said shoulder of the female member bordering the opening therein through which the male member projects and said shoulder of the male member having an outer diameter substantially equal to the diameter of said opening in said female member and spaced from said shoulder of the latter, the said shoulder of the latter being overhung by an annular wall of said recess therein, a ring engaged in said last-named recess and substantially filling the same, and a companion ring of smaller diameter than the annular shoulder of the male member disposed between the latter and the first-named ring and substantially filling the space between the latter and the last-named shoulder, said rings cooperating with said shoulders and each other to prevent relative axial movement of said members in other directions.

9. A swivel joint for a pair of axially interengaged and aligned relatively rotatable male and female members equipped with opposed formations for preventing relative axial movement thereof in one direction, said joint comprising a substantially L-shaped annular recess in the female member bordering the opening therein through which the male member projects and a similar recess in the male member spaced from said recess in said female member, each of said recesses presenting an annular shoulder opposed to the said shoulder of the other thereof, and a pair of wire rings disposed in said recesses and substantially filling the space between said shoulders, the ring engaged in the recess of the female member being of less inner diameter than the outer diameter of the companion ring and partially overlapping the same, said rings cooperating with said shoulders and with each other to prevent relative axial movement of said members in the other direction.

IRVING COWLES.